United States Patent [19]

Goodell et al.

[11] Patent Number: 5,236,028
[45] Date of Patent: Aug. 17, 1993

[54] VEHICLE WHEEL END ASSEMBLY

[75] Inventors: Fred L. Goodell, Grosse Ile; Michael J. Ellison, Canton, both of Mich.

[73] Assignee: AM General Corporation, South Bend, Ind.

[21] Appl. No.: 750,436

[22] Filed: Aug. 20, 1991

Related U.S. Application Data

[60] Continuation of Ser. No. 143,022, Jan. 12, 1988, abandoned, which is a division of Ser. No. 752,576, Jul. 8, 1985, Pat. No. 4,730,656.

[51] Int. Cl.$^5$ ................................. 301 105.1; 384 484; 384 569
[52] U.S. Cl. .................................................. 152/417
[58] Field of Search ............... B60C/23/00; 152/415, 152/416, 417; 301/105 R, 131; 384/484, 569, 513, 475

[56] References Cited

U.S. PATENT DOCUMENTS

| | | | |
|---|---|---|---|
| 1,826,523 | 10/1931 | Poorman | 152/416 |
| 2,124,526 | 7/1938 | Goldsworthy | 277/83 |
| 2,253,118 | 8/1941 | Gillespie et al. | 73/146.4 |
| 2,277,979 | 3/1942 | Horger | 277/188 R |
| 2,634,783 | 4/1953 | Turek et al. | 152/417 |
| 2,873,153 | 2/1959 | Haynie | 384/484 |
| 2,976,906 | 3/1961 | Kamm et al. | 152/417 |
| 3,014,768 | 12/1961 | Dickinson | 384/484 |
| 3,362,452 | 1/1968 | Harnish | 152/416 |
| 3,499,654 | 3/1970 | Lower | 277/82 |
| 3,531,167 | 9/1970 | Edge et al. | 384/475 |
| 3,583,511 | 6/1971 | Asberg | 180/370 |
| 3,589,747 | 6/1971 | Asberg | 280/96.1 |
| 3,705,614 | 12/1972 | Juttner et al. | 152/417 |
| 3,752,543 | 8/1973 | Schmidt | 384/484 |
| 3,937,539 | 2/1976 | Jones et al. | 384/571 |
| 4,015,883 | 4/1977 | Taylor | 384/484 |
| 4,043,620 | 8/1977 | Otto | 384/485 |
| 4,336,971 | 6/1982 | Reiter | 384/484 |
| 4,418,737 | 12/1983 | Goodell et al. | 152/416 |
| 4,428,630 | 1/1984 | Folger et al. | 384/482 |
| 4,431,043 | 2/1984 | Goodell et al. | 152/417 |
| 4,434,833 | 3/1984 | Swanson | 152/417 |
| 4,470,506 | 9/1984 | Goodell et al. | 206/223 |
| 4,498,709 | 2/1985 | Wells et al. | 301/5 VH |
| 4,605,319 | 8/1986 | Korenhof | 384/484 |
| 4,730,656 | 3/1988 | Goodell et al. | 152/417 |
| 4,754,792 | 7/1988 | Braun et al. | 152/417 |
| 4,844,138 | 7/1989 | Kokubu | 152/417 |

FOREIGN PATENT DOCUMENTS

| | | |
|---|---|---|
| 0071278 | 11/1983 | European Pat. Off. . |
| 0130476 | 6/1987 | European Pat. Off. . |
| 1938202 | 2/1971 | Fed. Rep. of Germany . |
| 1168394 | 10/1969 | United Kingdom . |

OTHER PUBLICATIONS

*Timken* 1972 Rolling Mill Equipment Supplement at p. 10.

*The Timken Company v. AM General Corp.*, Case No. 5:91 CV 0396, U.S. District Court for the Northern District of Ohio (Judge Sam H. Bell).

*Primary Examiner*—Michael W. Ball
*Assistant Examiner*—Francis J. Lorin
*Attorney, Agent, or Firm*—Brooks & Kushman

[57] ABSTRACT

A vehicle wheel end assembly (10) is adaptable for use with an on-board central tire inflation system. The assembly provides a passage for the routing of air between the on-board system and the vehicle tire. The assembly comprises a stationary spindle (12) and a rotational hub (14) mounted thereon. The hub is supported for rotation by first and second axially spaced bearing sets (16, 18), each having an inner race (20, 26) and an outer race (22, 28) associated with the spindle and hub, respectively. The inner race of the inboard bearing set (18) is formed with an axial air passage (46) which communicates with an internal chamber (36) in the hub to form a portion of the air passage between the tire and on-board system. In another feature, rotary seals (60, 62) are seated in opposed faces of the bearing sets and include sealing lips (72) which have a sealed contact with the upper surface of the inner bearing races. An inboard spindle collar (100) may also be employed to facilitate the continuation of the air passage (98) in the bearing race (90) to the on-board system.

9 Claims, 4 Drawing Sheets

VEHICLE WHEEL END ASSEMBLY

This is a continuation of copending application Ser. No. 07/143,022 filed on Jan. 12, 1988 now abandoned, which is a divisional of application Ser. No. 06/752,576 filed Mar. 8, 1980 now U.S. Pat. No. 4,730,656.

TECHNICAL FIELD

This invention relates to central tire inflation systems, and, more particularly, to a wheel end assembly adapted for use with such a system.

BACKGROUND ART

The present invention presents an alternative design to the vehicle wheel end assembly disclosed in co-pending application Ser. No. 712,420, filed Mar. 18, 1985, now U.S. Pat. No. 4,733,707, and assigned to the assignee of the present invention.

In the co-pending application it was recognized that one of the important design considerations inherent in a central tire inflation system is the need for a reliable seal in the wheel assembly between rotating and non-rotating members. This design consideration is addressed by the present invention in a manner which requires minimal necessary modifications of the major components, i.e. spindle and hub, of the wheel end.

DISCLOSURE OF THE INVENTION

The present invention provides a wheel end assembly for a central tire inflation system which features modification of the wheel bearings to achieve a reliable sealed air passage between the rotational and non-rotational members of the assembly.

In broad terms the wheel end assembly of the present invention comprises a spindle or axle housing which is non-rotational and attached to the vehicle chassis. A hub is mounted concentrically on the spindle for rotation thereon. The hub is formed with an internal chamber which represents a portion of the overall air passage between the on-board inflation system and the respective pneumatic tire mounted on the wheel.

The hub is supported for rotation on the spindle by first and second axially spaced bearing sets. Each bearing set has a non-rotational inner race associated with the spindle and a rotational outer race associated with the hub. The inner race of the inboard bearing set is formed with an axial air passage which communicates with the internal chamber in the hub to provide an inboard continuation of the overall air passage.

In another feature of the invention, the rotary sealing between the rotational hub and the non-rotational spindle is accomplished by a pair of annular rotary seals mounted on the respective inboard and outboard bearing sets. More specifically, each annular seal includes a flange portion which seats in a notch formed in the face of the outer race. An integral lip extends radially inward and into sealing contact with the upper surface of the inner race. The seal flanges are secured in their notched seats by cooperation of the hub.

In an alternate embodiment of the invention, an inboard collar may be mounted on the spindle to facilitate coupling of the air passage formed in the inner race of the inboard bearing set with the on-board system.

Other features and advantages of the invention will become apparent in connection with the following detailed description.

BEST MODE FOR CARRYING OUT THE INVENTION

Figure 1:
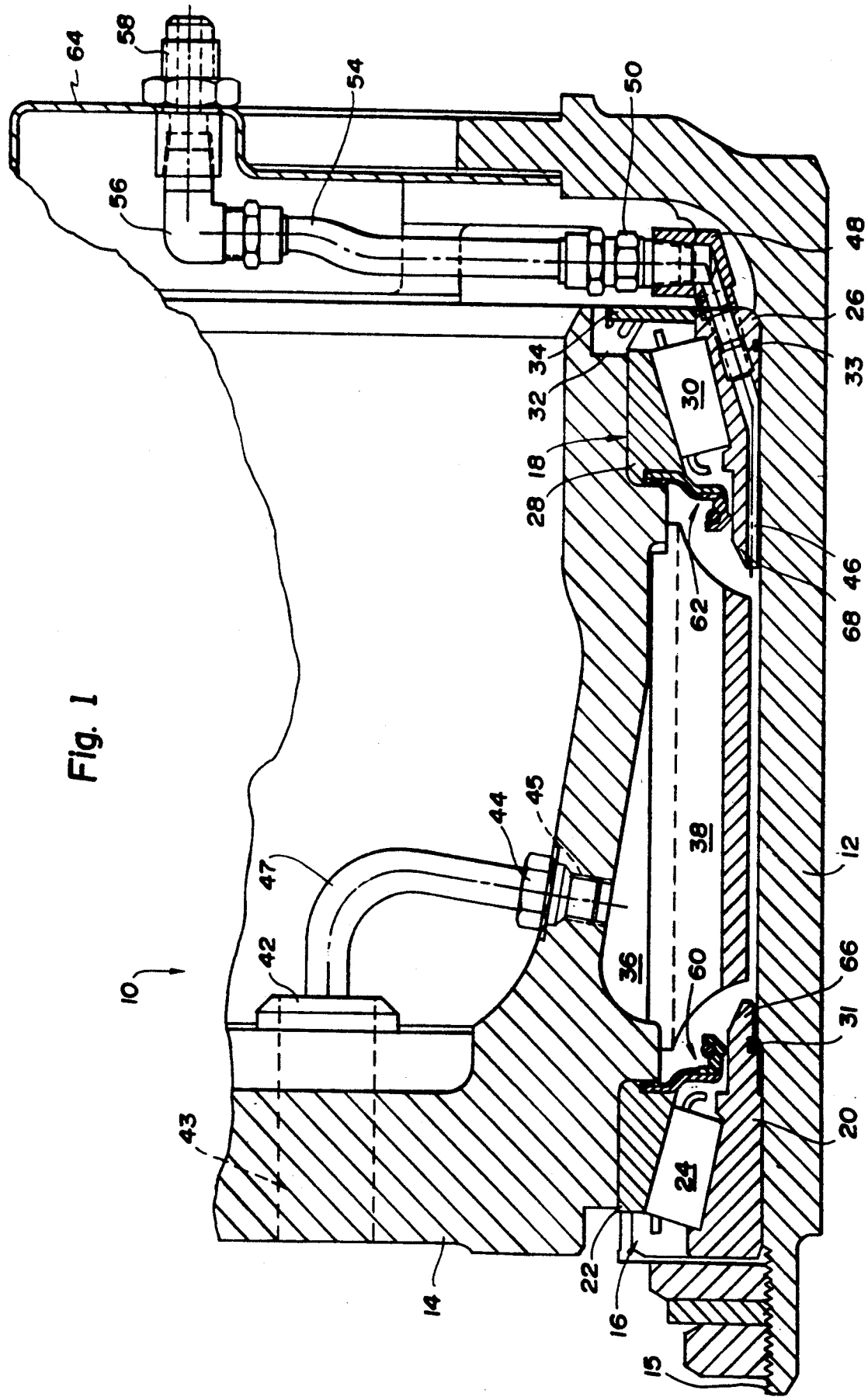
FIG. 1 is a side sectional view of the relevant portion of a vehicle wheel end assembly in accordance with the present invention.

FIG. 1 illustrates the portion of a vehicle wheel end assembly 10 relevant to an understanding of the present invention. The assembly 10 is suited for use with an on-board automated system for controlling tire pressurization. A wheel end assembly of similar function is disclosed in co-pending application Ser. No. 712,420, filed Mar. 18, 1985, now U.S. Pat. No. 4,733,707 and assigned to the assignee of the present invention.

The wheel end assembly 10 includes a spindle or axle housing 12 which is mounted in fixed relation to the vehicle chassis. A hub 14 is mounted for rotation on the spindle 12. The hub 14 is driven in a conventional manner by an axle shaft and drive flange (not shown but understood in the art).

The hub 14 is supported for rotation on the spindle 12 by an outboard bearing set 16 and an inboard bearing set 18. The bearing set 16 includes an inner race 20 mounted on the spindle 12. An outer race 22 is mounted on the hub 14 and is co-rotational with the hub. A representative tapered roller bearing 24 is disposed between the inner race 20 and the outer race 22.

The bearing set 18 similarly includes an inner race 26 associated with the spindle 12 and an outer race 28 which is co-rotational with the hub 14. A representative tapered roller bearing is shown at 30.

The inner races 20 and 26 each have formed in them grooves to receive respective O-rings 31 and 33 to provide a fluid seal between the underside of the race and the spindle 12.

The hub 14 is formed with an internal air chamber which represents a portion of an overall air path between the on-board automated system and the respective tire carried by the vehicle wheel end assembly. A sleeve 38 is disposed in a major portion of the volume between the hub cavity 36 and the outer surface of the spindle 12. The function of the sleeve 38 is as a spacer means to minimize abrasion of the components adjacent the spindle 12 against the out-board spindle threads 15 when the hub 14 is fitted onto or removed from the spindle. The sleeve 38 has a noninterfering relation to the passage of air within the volume it occupies.

Figure 3:
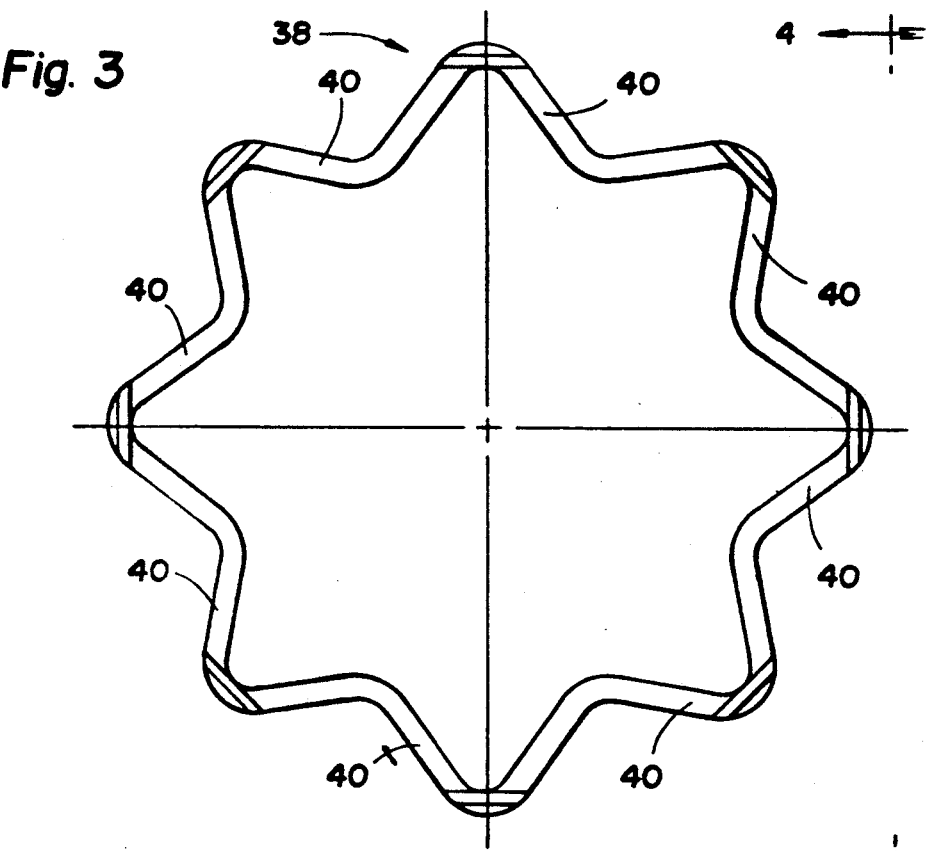
FIG. 3 is an end view of a sleeve mounted concentrically on the spindle to maintain spacing of the hub during installation and removal.
Figure 4:
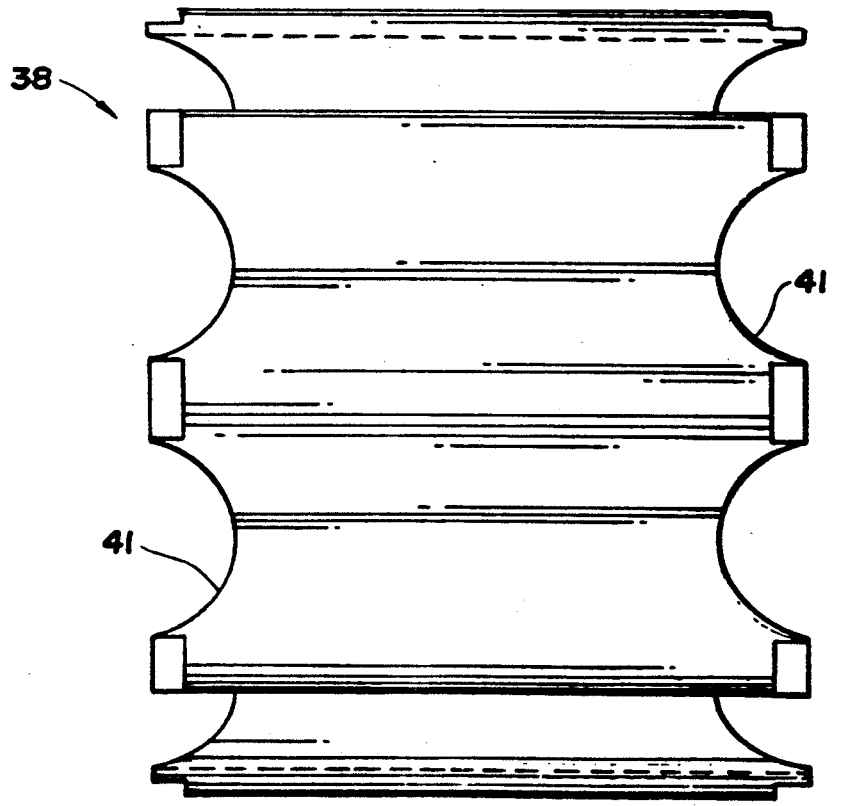
FIG. 4 is a side elevation view of the sleeve taken along line 4—4 of FIG. 3.

With reference to FIGS. 3 and 4, the sleeve 38 is shown in greater detail. It can be seen that the sleeve has a substantially cylindrical shape with radial surface undulations 40. The opposite ends of the sleeve 38 are formed with scallops 41 to permit radial flow of air with minimal obstruction.

Again with reference to FIG. 1, the environment of the bearing set 18 is sealed from foreign material by a dirt slinger 32 which includes a pair of fingers which bear against a ring 34 mounted concentrically on the inner race 26.

A feature of the present invention is the manner in which pressurized air is routed between the tire carried by the wheel end assembly 10 and the on-board system. In traversing this route in an outboard to inboard order, the air passage begins with an aperture 43 formed in an integral radial segment of the hub 14. The aperture 43 may be fitted with a hollow stud 42 or the like to facilitate connection to a conventional air line (not shown) outboard of the assembly 10.

A tube 47 is connected between the hollow stud 42 and a fitting 44. The fitting 44 has a threaded engagement with a tapped hole 45 formed in the hub 14.

The air path is continuous through the internal chamber 36 in the hub 14 to a passage 46 formed in the inner race 26 of the inboard bearing set 18. The air passage 46 is ported generally inboard of the hub 14 and connected to an adapter 48. The adapter 48 is in turn corrected to one end of a tube 54 through a conventional fitting 50. The other end of the tube 54 is connected to one side of an elbow 56. The other side of the elbow is connected to a fitting 58 mounted on a chassis member 64. From this point the air can be routed to the on-board system in a conventional manner.

The air passage just described is sealed in the environment of the hub chamber 36 by a pair of rotary seals indicated generally at 60 and 62. The seal 60 is mounted in fixed relation to the outer bearing race 22 in cooperation with the hub 14 and has a sealed contact with an extension 66 of the inner race 20.

Similarly, the rotary seal 62 is mounted in fixed relation to the outer race 28 bearing sets 18 with the cooperation of the hub 14, and has a sealed contact with an extension 68 of the inner race 26.

Figure 2:
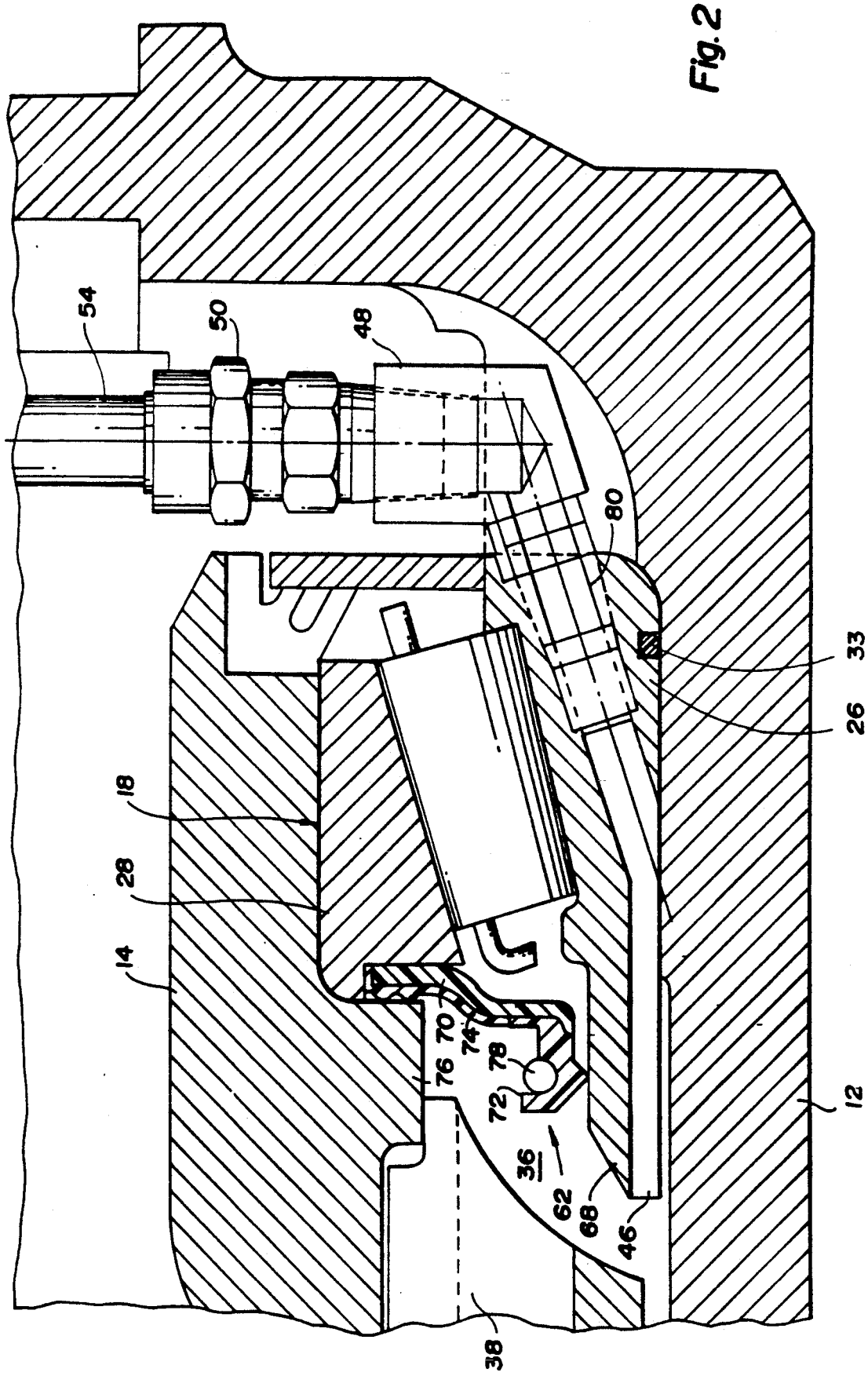
FIG. 2 is an enlarged view of a portion of the wheel end assembly of FIG. 1 illustrating the sealed air passage between the rotational and non-rotational members in greater detail.

FIG. 2 illustrates in greater detail the localized area of the inboard bearing set 18.

The inner, non-rotational race 26 is shown mounted on the spindle 12 and sealed there against by the O-ring 33.

The rotary seal assembly 62 comprises several constituents described as follows. A generally radially extending flange portion 70 is mated with a reinforcing segment 74 and mounted in a notch 65 formed in the internal face of the outer race 28. The flange 70 and reinforcing member 74 are held in fixed position relative to the outer race 28 with the cooperation of a dependent shoulder 76 of the hub 14. As shown in FIG. 2, this cooperation locates and seats the rotary seal means in a manner which seals the outer race 28 to the hub 14.

The radial flange 70 is connected to a lip segment 72 formed of low friction material which contacts the extension 68 of the inner race 26. A garter spring 78 provides a radial inward force to hold the lip 72 into sealed contact with the extension 68 of the inner race 26. The air passage 46 through the inner race 26 thereby communicates with the hub chamber 36 and is sealed at the inboard end by the action of the rotary seal assembly 62.

The air passage 46 is ported at its inboard end through a threaded fitting 80 which couples to the adapter 48. As previously described in reference to FIG. 1, the adapter receives a fitting 50 which is in turn connected to a tube 54. As shown in FIGS. 1 and 2, air passage 46 is formed at least in part by a peripheral recess in the inner race.

Figure 5:
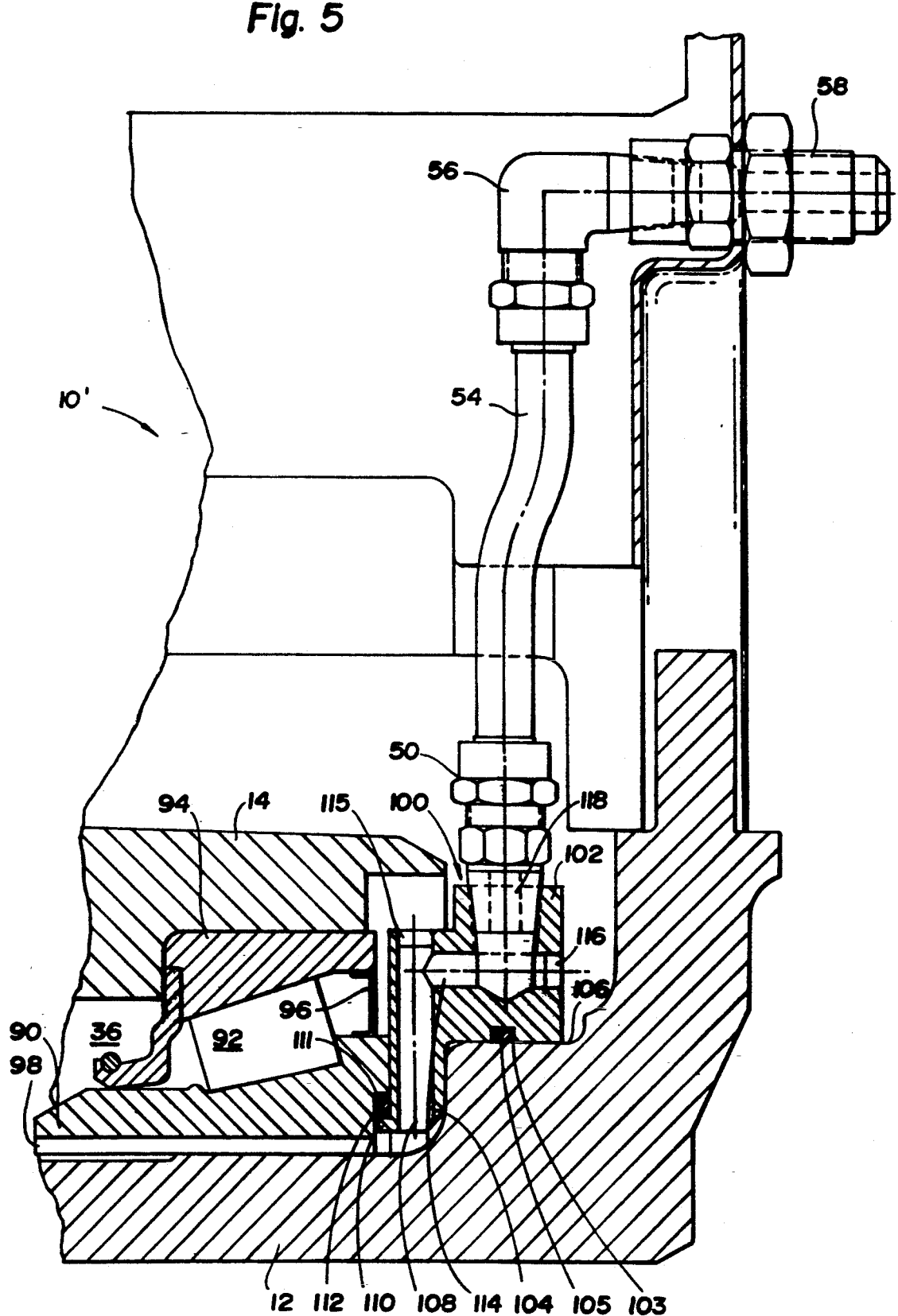
FIG. 5 is an enlarged sectional view of an alternative embodiment of the wheel end assembly featuring an inboard collar which mounts on the spindle and interconnects the air passage in the inner bearing race to air lines which extend to the on-board system.

FIG. 5 is an alternative embodiment of a vehicle wheel end assembly, indicated generally at 10', of the present invention. In description of FIG. 5, like reference numerals will be used for members common to the embodiments of FIGS. 1 and 5.

The vehicle wheel end assembly 10' similarly includes a spindle 12 and a hub 14 mounted for rotation on the spindle. The hub 14 is supported for rotation at the inboard end by a bearing set which includes an inner race 90 associated with the spindle, and an outer race 94 which is co-rotational with the hub 14. A roller bearing 92 is disposed between the inner race 90 and the outer race 94.

An annular dust seal 96 having a channel-shaped cross section is press fit into the radial gap between the inner race 90 and the outer race 94 rearward of the roller bearing 92.

The inner race 90 is formed with an axially extending air passage 98 to communicate the chamber 36 between the spindle 12 and the hub 14 with a collar, indicated generally at 100. As shown in FIG. 5, the air passage 98 is formed by a peripheral recess in the inner race 90. The collar 100 is positioned inboard of the bearing set and mounted concentrically on the spindle.

The collar 100 includes an annular body 102 and an integral flange 104 which extends radially inward from the body.

The annular body 102 is seated on a step 106 on the spindle 12. An annular groove 103 is formed in the inner radial surface of the body 102 and seats an O-ring 105 to seal the collar 100 against the spindle 12.

The inward radial flange 104 includes a lip 110 which cooperates with a notch 111 formed in the inboard axial face of the race 90 to seat and seal another O-ring 112.

The collar 100 communicates with the axial extending passage 98 in the inner race 90 through a radial bore 108. The outer opening of the bore 108 is closed by a plug 115. An axial bore 114 continues the air path with the radial bore 108. The inboard end of the axial bore 114 is closed by a plug 116. A second radial bore 118 continues the air path to an air line which extends to the on-board system. The second radial bore 118 is threaded to receive the fitting 50. As previously described in connection with FIGURE 2, the fitting 50 connects through tube 54, elbow 56 and fitting 58 to continue the air path toward the on-board automated system.

Although the invention has been shown and described in specific embodiments it is to be understood that modifications to the disclosed designs may be made without departing from the scope of the following claims.

The embodiments of the invention in which an exclusive property or privilege is claimed are defined as follows:

1. A vehicle wheel end assembly adapted for use with an automated system for controlling tire pressurization comprising:

a spindle;

a hub having a portion of an air path for communication between the automated system and the respective tire;

bearing means for rotatably supporting said hub on said spindle, said bearing means including a bearing set having an air passage opening at one end for communication with said hub air path portion and opening at the other end for communication with the automated system;

means for sealing the bearing set with respect to said spindle and to said hub; and wherein said bearing set has inner and outer races and wherein said sealing means includes a rotary seal between said inner and said outer races of said bearing set.

2. The wheel end assembly according to claim 1 wherein said second bearing means further comprises a second bearing set having inner and outer races and a rotary seal between said inner race and said outer race.

3. A vehicle wheel end assembly adapted for use with an automated system for controlling tire pressurization comprising:

a spindle mounted in non-rotary relation to the vehicle;

a hub having an air path for communication between the automated system and the respective tire;

bearing means for rotatably supporting said hub on said spindle disposed between the spindle and the hub, said bearing means having an air passage with an opening at one end to the hub air path and at the other end generally inboard of the hub;

a collar mounted concentrically on the spindle and having an air passage extending between a first port, which communicates with the other end opening of the bearing air passage, and a second port, which communicates with the automated system;

means for sealing said collar to said bearing means beyond the periphery of said first port;

wherein said bearing means includes an inner race and an outer race and wherein said means for sealing comprises a seal member engaging said inner race and said collar.

4. A vehicle wheel end assembly adapted for an automated system for controlling tire pressurization comprising:

a spindle;

a hub having an air path for communication between the automated system and the respective tire;

bearing means for rotatably supporting said hub on said spindle disposed between the spindle and the hub, said bearing means having an air passage opening at one end for communication with said air path and opening at the other end generally inboard of the hub for communication with the automated system;

said bearing means including a bearing set disposed generally inboard of the hub air path and having a non-rotational member with the air passage formed therein;

said bearing set includes a rotational outer race associated with the hub and a non-rotational inner race associated with the spindle, and further wherein the air passage is formed within the inner race; and wherein said air passage is formed at least in part by a peripheral recess in said inner race.

5. A vehicle wheel end assembly adapted for an automated system for controlling tire pressurization comprising:

a spindle mounted in non-rotary relation to the vehicle;

a hub having an air path for communication between the automated system and the respective tire;

bearing means for rotatably supporting said hub on said spindle disposed between the spindle and the hub, said bearing means having an air passage with an opening at one end to the hub air path and at the other end generally inboard of the hub;

a collar mounted concentrically on the spindle and having an air passage extending between a first port, which communicates with the other end opening of the bearing air passage, and a second port, which communicates with the automated system; and means for sealing said collar to said bearing means beyond the periphery of said first port.

6. A vehicle wheel end assembly adapted for an automated system for controlling tire pressurization comprising:

a spindle mounted in non-rotary relation to the vehicle;

a hub having an air path for communication between the automated system and the respective tire;

bearing means for rotatably supporting said hub on said spindle disposed between the spindle and the hub, said bearing means having an air passage with an opening at one end to the hub air path and at the other end generally inboard of the hub;

a collar mounted concentrically on the spindle and having an air passage extending between a first port, which communicates with the other end opening of the bearing air passage, and a second port, which communicates with the automated system;

wherein said collar comprises an annular body having a radially inward extending flange; and at least a portion of said air passage in said collar extends through said inward radial flange.

7. A vehicle wheel end assembly adapted for use with an automated system for controlling tire pressurization comprising:

a spindle mounted in non-rotary relation to the vehicle;

a hub having a first air path portion for communication between the automated system and the respective tire;

bearing means for rotatably supporting said hub to said spindle disposed between the spindle and the hub;

a second air path portion associated with said non-rotary spindle;

rotary seal means for communicating the first air path portion in the rotational hub to said second air path portion, said rotary seal means being positioned in fixed relation to said bearing means;

wherein the bearing means comprises first and second axially spaced bearing sets, each bearing set having an inner race and an outer race, and at least one of said races includes means for locating and seating the rotary seal means;

wherein said rotary seal means seals against the other of said races in each bearing set having said at least one race; and means for sealing said other race with respect to said spindle.

8. A vehicle wheel end assembly adapted for an automated system for controlling tire pressurization comprising:

a spindle mounted in non-rotary relation to the vehicle;

a hub having an air path for communication between the automated system and the respective tire;

bearing means for rotatably supporting said hub on said spindle disposed between the spindle and the hub, said bearing means having an air passage with an opening at one end to the hub air path and at the other end generally inboard of the hub;

a collar mounted concentrically on the spindle and having an air passage extending between a first port, which communicates with the other end opening of the bearing air passage, and a second port, which communicates with the automated system; and rotary seal means associated with the hub and the spindle for providing sealed fluid communication of the hub air path with the air passage of the bearing means.

9. A vehicle wheel end assembly for an automated system controlling tire pressurization comprising:

a spindle;

a hub having at least a portion of an air path between the automated system and a respective tire;

bearing means for rotatably supporting said hub on said spindle;

a second air path portion associated with said spindle;

rotary seal means for communicating said first air path portion to said second air path portion;

said bearing means comprising at least one bearing set with an outer race and an inner race;

wherein said rotary seal means comprises a seal pressed between said outer race and said hub and sealing against said inner race; and said second air path portion comprises an air passage through said inner race.

* * * * *

UNITED STATES PATENT AND TRADEMARK OFFICE
CERTIFICATE OF CORRECTION

PATENT NO. : 5,236,028
DATED : August 17, 1993
INVENTOR(S) : Fred L. Goodell and Michael J. Ellison It is certified that error appears in the above-identified patent and that said Letters Patent is hereby corrected as shown below:

Column 3, line 24, delete "corrected" and substitute -- connected --.

Signed and Sealed this

Seventeenth Day of May, 1994

Attest:

BRUCE LEHMAN

Attesting Officer    Commissioner of Patents and Trademarks